3,340,226
FLAME RETARDANT SYSTEMS AND COMPOSITIONS

Edward C. Stivers, Atherton, Calif., assignor to Raychem Corporation, Redwood City, Calif., a corporation of California
No Drawing. Filed Feb. 11, 1963, Ser. No. 257,764
23 Claims. (Cl. 260—45.75)

The present invention relates to systems which may be employed to impart flame retardant properties to flammable materials and to the flame retarded compositions comprising the combination of these systems with otherwise flammable materials. The present invention also relates to the process of producing the flame retarded compositions of the present invention. More particularly, the present invention relates to the use of certain derivatives of halogen-bearing carboxylic acids in flame retardant systems.

Flame retardant systems which comprise the combination of halogenated organic compounds such as highly chlorinated paraffin with an organic oxide or salt such as antimony salts have found some use in the prior art. However, the organic components of these systems have been found to be subject to several serious deficiencies. One such deficiency is the undesirably high water sensitivity of these components.

This water sensitivity is detrimental to the combustion resistance of conventional flame retardant systems and, in addition, is detrimental to the dielectric properties of the materials in which conventional flame retardants are often incorporated. The latter disadvantage of conventional flame retardants is of considerable importance because these retardants are often incorporated in polymeric materials which are employed as electrical insulating materials.

The water sensitivity of conventional flame retardants manifests itself when compositions containing these flame retardants are subjected to treatment with boiling water. Such treatment results in substantial loss in combustion resistance and deterioration of the dielectric properties of the composition because of hydrolysis and/or loss of the halogen-bearing organic or inorganic component of the flame retardant system to the water. Furthermore, these systems also manifest their water sensitivity when subjected to relatively humid atmospheres and relatively high temperatures because of hydrolysis of the organic component into fragments which are capable of ionization and hence are electrically conductive and/or as a result of sublimation. Furthermore, this fragmentation by hydrolysis often results in the formation of highly volatile compositions, thereby decreasing combustion resistance.

Another serious deficiency of conventional flame retardant systems is the tendency of these systems to volatilize or sublime at elevated temperatures which often causes decomposition with resultant liberation of corrosive materials such as hydrogen halides. The present invention substantially eliminates these deficiencies.

It is a principal object of the present invention to provide flame retardant systems comprising derivatives of halogen bearing carboxylic acids which derivatives are substantially water insoluble, substantially resistant to hydrolysis and which have a desirably low volatility and sublimability as well as flame retarded compositions containing these derivatives.

Another object of the present invention is to provide novel cross-linked polymeric compositions having flame retardant properties.

Another object of the present invention is to provide a flame retardant system which will function effectively at levels of addition less than those necessary for conventional flame retardants.

Still another object of the present invention is to provide flame retardant systems which do not substantially impair the physical properties, e.g., flexibility, strength, of the flammable materials into which they are incorporated, and actually improve some or all of these properties.

Other objects and advantages of the present invention, it is believed, will be readily apparent from the following detailed description of preferred embodiments thereof.

Briefly, the present invention includes within its scope the use of certain derivatives of halogen bearing carboxylic acids as components in flame retardant systems. Among these derivatives are the metal tetrahalophthalates, the metal trihalobenzoates, metal salts of endo-1,4,5,6,7,7-hexachlorobicyclo - (2.2.1) - 5 - heptene-2,3-dicarboxylic acid (sometimes referred to as HET or chlorendic acid), and metal salts of tetrahalo-o-sulfobenzoic acids. These derivatives are combined with suitable metal salts of the metals in Groups III, IV, and V of the Periodic Table as set forth in the Handbook of Chemistry and Physics, page 393 (37th Edition, 1955–1956), published by the Chemical Rubber Publishing Company. It is believed that these salts combine with the derivative at flame temperature to produce an inorganic halide which volatilizes and effectively functions to inhibit burning. Examples of such flame inhibiting inorganic halides are antimony trichloride, bismuth tribromide and, in general, halides of elements in Groups III, IV, and V of the Periodic Table.

The flame retardant systems of the present invention may be combined with virtually any compatible flammable material, e.g., polymeric materials such as polyolefins (e.g., polyethylene and polypropylene), polyurethanes, polystyrene, etc. Flame retarded compositions produced according to the present invention may also be cross-linked by suitable means such as chemical means and high energy irradiation without detrimenal effect on combustion resistance. In order to function most effectively, the flame retardant systems of the present invention should be chosen such that they will operate to produce an effective amount of inorganic halide at the flame temperature of the plastic or other flammable material with which they are combined. Thus, to some extent, the choice of flame retardant system will depend upon the choice of flammable material.

Among the derivatives of halogen-bearing carboxylic acids which may be used in the present invention are metal tetrahalophthalates. These compounds may be produced as follows:

Example I 464 grams of tetrabromophthalic anhydride were treated with 115 grams of potassium hydroxide in two liters of water. As this mixture was gently heated in a beaker, the anhydride reacted and went into solution. The pH of the resulting mixture was about 8. Five grams of tetrabromophthalate anhydride was added to the reaction mixture so as to adjust the pH to 6. The result was a cloudy solution. The hot solution was clarified by filtration and, upon cooling, dipotassium tetrabromophthalate crystallized out. More dipotassium salt could be induced to separate by the addition of methanol. The resulting slurry was filtered and the solid washed several times with methanol and dried in an oven at 110° C.

14.7 grams of calcium chloride dihydrate was dissolved in 100 ml. of distilled water. 56 grams of dipotassium tetrabromophthalate was separately dissolved in 200 ml. of distilled water. The two solutions were mixed and an immediate precipitate of calcium tetrabromophthalate resulted. The precipitate was filtered, washed with hot water, washed with dilute potassium hydroxide solution, dilute hydrochloric acid solution and, finally, hot water (90° C.) to a pH of 7. It was observed that some of the calcium salt dissolved in the hot water, and subsequently crystallized out as the filtrate cooled. The calcium salt was triturated with boiling methanol and filtered. The product was dried at 100° C. The yield was about 50% of theoretical.

*Example II*

928 grams of tetrabromophthalic anhydride were reacted with 230 grams of potassium hydroxide in 5 liters of distilled water. A substantial amount of heat was generated by this step and the resulting cloudy solution appeared to be near boiling. The pH of the solution was about 6. The solution was filtered to remove traces of undissolved anhydride and neutral organic matter. 500 grams of aluminum nitrate nonahydrate, dissolved in 2 liters of water were added to the clear filtrate while still warm. An immediate fine particle size precipitate was formed of aluminum tetrabromophthalate. The precipitate was triturated with boiling distilled water and filtered. Finally, it was triturated with boiling methanol to remove traces of unreacted anhydride and filtered. The yield was about 90% of theoretical. No sublimation was observed when this product was heated to over 300° C., whereas with the anhydride precursor, sublimation occurred at 150° C. and, as temperature approached 260° C., sublimation was appreciable.

*Example III*

The silver, stannic and zinc tetrabromophthalates were made according to the process described in Example I with the exception that the nitrates of these metals were used rather than calcium nitrate.

The flame retardant properties of these materials were tested as follows:

*Example IV*

The following basic formulation, expressed in parts by weight, was used for testing purposes:

| | |
|---|---|
| Polyethylene (DYNK) | 100.0 |
| Antimony oxide | 25.0 |
| Carbon black (Wilson Masterbatch 3762) | 10.0 |
| 4,4'-thiobis-(6-t-butyl-m-cresol) | 1.5 |
| Triallyl cyanurate | 4.0 |
| Tetrabromophthalate salt | 30.0 |

DYNK is a polyethylene manufactured by Union Carbide and has a melt index of 0.2–0.4. This polymer was combined with the remaining ingredients in this and the following examples by milling on a two roll laboratory mill.

Slabs comprising this formulation were formed. These slabs had a thickness of 1/16 inch and were irradiated with high energy electrons to a dose of 20 megarads. These slabs were tested according to the procedures described in the footnotes in Table 1. The results of those tests are set forth in Table 1.

TABLE 1 (20 MRAD DOSE)

| Tetrabromophthalate salt | Flame Retardancy Action [1] | Sublimability [2] | Heat Aging [3] | Water Sensitivity [4] | Reaction with boiling water [5] | Modulus, p.s.i. [6] | Ultimate Strength (150° C.), p.s.i. |
|---|---|---|---|---|---|---|---|
| Tetrabromophthalic-control anhydride | Good | Substantial | Flexible | Poor | 5.9-3.5-2.7 | 52 | 80 |
| Aluminum | Excellent | None | do | Good | 5.9-5.1-4.8 | 89 | 107 |
| Dipotassium | Fair | do | do | do | | 82 | 73 |
| Stannic | do | do | do | do | | 71 | 56 |
| Calcium | Excellent | do | Very slight cracking | do | 5.9-4.5-3.8 | 70 | 54 |
| Zinc | Fair | do | Cracking | do | | 70 | 80 |
| Silver | Good | do | Very brittle | do | | 102 | 49 |

[1] ASTM Test D-635.
[2] Strips placed in lightly corked test tubes for 120 hours at 175° C. after which time the surface of the strips was examined for the presence of white sublimate.
[3] As (2) above, strips examined for flexibility.
[4] Strips suspended over surface of distilled water in lightly corked test tube for 120 hours at 90° C., after which time the surface of the strips examined for the presence of white product.
[5] Approximately 1 gram of small slivers (cut with razor blade) from the irradiated slabs (20 mrad) were added to 200 ml. of distilled water. The pH was measured (the first number). The mixture boiled for 10 min., cooled and the pH measured (the second number). The mixture was again boiled for 10 min., cooled and the pH measured (the third number).
[6] Modulus of Elasticity at 150° C.

In the sublimation determination for the control sample in this example, it was noted that gross white crystals appeared on the surface of this sample, whereas no such crystals appeared on the remaining samples.

The flame retardant systems described in this example are substantially insensitive to water. Thus, the flame retardant properties of the samples used in this example were not significantly changed when these samples were brought into contact with boiling water. The flame retardant systems described in this example are also substantially non-volatile and thus are particularly useful in flammable compositions which have high curing temperatures such as silicone resins which must be cured at temperatures of 250° C. and higher. These flame retardant systems are also useful in high vacuum applications for the same reason. The aluminum salt is particularly resistant to sublimation.

The improvement in the modulus of elasticity of the samples of the present invention comprises a significant advantage of this invention. This improvement is a rather marked departure from conventional flame retardants which have a tendency to impair the structural properties of polymeric materials.

It has also been found that the salts of this example are highly effective per unit weight. For example, the aluminum salt appears to be 70% more effective per unit weight than the anhydride. This significant increase in effectiveness is believed to be a result of the substantial non-volatility of the aluminum salt and, perhaps, the result of possible formation of aluminum halide at flame temperatures which might itself have a flame retardant action.

*Example V*

The following basic formulation, expressed in parts by weight, was prepared for testing purposes:

| | |
|---|---|
| Polyethylene (DYNK) | 100 |
| Carbon black (Wilson's Masterbatch No. 3762) | 10 |
| 4,4'-bis-thio-(6-t-butyl-m-cresol) | 1.5 |
| Triallyl cyanurate | 4 |
| Antimony oxide | 25 |
| Flame retardant (ground but generally not screened) | 30 |

Samples were prepared in the same manner as that described in Example IV with the exception that some slabs were not irradiated and some slabs were irradiated at doses of 40 megarads (as indicated in Table 2) with high energy electrons. These samples were tested according to the general procedures described in Example IV and the results are set forth in Table 2.

parts by weight, were prepared for testing purposes as follows:

| | Formulation A | Formulation B |
|---|---|---|
| Polyethylene (DYNK) | 100 | 100 |
| Antimony oxide | 25 | 12.5 |
| Carbon black (Wilson's Masterbatch No. 3762) | 10 | 10 |
| 4,4'-thiobis-(6-t-butyl-m-cresol) | 1.5 | 1.5 |
| Triallyl cyanurate | 4 | 4 |
| Aluminum 2,3,4-triiodobenzoate | 30 | 15 |

These formulations were formed into slabs having a thickness of 1/16 inch. Some of these slabs were irradiated with high energy electrons to a dose of 20 megarads. These slabs were then tested according to ASTM Test D–635. The results of these tests are set forth in Table 3.

TABLE 3

| Formulation | Irradiation Dose | Observation |
|---|---|---|
| A | 0 | Immediately self-extinguishing after removal of flame. |
| A | 20 | Do. |
| B | 0 | Self-extinguishing after 1" mark. |
| B | 20 | Do. |

TABLE 2

| Basic Recipe Including Flame Retardant | Flame Retardancy Action [1] | Was There Dripping? | Is Flame Retarding Action Affected by Irradiation? (to 40 mrads) | 20 mrad Samples | | | |
|---|---|---|---|---|---|---|---|
| | | | | Modulus at 150° C. (p.s.i.) [2] | Ultimate Strength (p.s.i.) | Water Sensitivity [3] | Heat Aging [4] |
| Cuprictetrabromophthalate | Self extinguishing 0.4" in ½ min. | No | No | 49 | 51 | Crystals after 86 hrs. | Brittle. White Sublimate. |
| Nickelous tetrabromophthalate | Drips out | Very much | No | 86 | 51 | None | Brittle. A very slight sublimate. |
| Cerium (III) tetrabromophthalate | do | do | No | 105 | 100 | do | Slight cracking. |
| Ferric tetrabromophthalate | Self extinguishing 0.2" in ½ min. | Slight | No | 71 | 61 | do | Brittle. |
| Ferrous tetrabromophthalate | Self extinguishing 0.4" in ½ min. | do | No | 98 | 96 | do | Do. |
| Mercuric tetrabromophthalate | Drips out | Very much | | 102 | 114 | White bloom after 76 hrs. | Very flexible. White sublimate. |
| Beryllium tetrabromophthalate | Completely self-extinguishing. | Only on 40 mrad sample. | No | 92 | 78 | None | Brittle. A very slight sublimate. |
| Yttrium tetrabromophthalate | Self extinguishing or drips out. | A function of irradiation dose. | Yes | 94 | 120 | do | Very flexible. |
| Indium tetrabromophthalate | Drips out | Very much | No | 72 | 52 | do | Do. |
| Gallium tetrabromophthalate | do | do | No | 51 | 46 | do | Do. |
| Aluminum endo-1,4,5,6,7,7-hexachlorobicyclo-[2.2.1]-5-heptene-2,3-dicarboxylate. | Self extinguishing 0.9" in 1⅓ min. | No. (Slight on 0 mrad sample.) | No | 212 | 77 | Very, very slight white bloom. | Brittle. Very small amount of white sublimation. |
| Ditto, but salt screened through 325 mesh screen (a new batch of salt). | Self extinguishing 0.6" in ½ min. | do | No | 205 | 108 | None | Brittle. No sublimation. |
| Lead (II) endo-3,4,5,6,7,7-hexachlorobicyclo-[2.2.1]-5-heptene-2,3-dicarboxylate. | Burns 0.9"/min | No | No | 90 | 67 | do | Very flexible. Very small trace of sublimation. |
| Aluminum tetrachlorophthalate | Burns 1.8"/min | Yes, to a slight extent. | No | | | do | Do. |
| Aluminum tetraiodophthalate | Self extinguishing immediately after flame is taken away. | No | No | | | do | Do. |
| Barium tetrabromobenzoate-o-sulfonate. | Burns 1.4'/min | No | No | | | do | Do. |

[1] ASTM Test D–635.
[2] Modulus of Elasticity at 150° C.
[3] Strips suspended over surface of distilled water in lightly corked test tube for 264 hours at 90° C. after which time the surfaces of the strips were examined for the presence of surface deposits.
[4] Strips placed in lightly corked test tubes for 264 hours at 175° C. after which time the strips were examined for the presence of sublimate and examined for flexibility.

*Example VI*

Aluminum 2,3,4-triiodobenzoate was made by neutralizing the parent acid with potassium hydroxide in dilute aqueous solution. Aluminum nitrate was added to this neutralized solution and an immediate white precipitate was formed. The product was washed with water to pH 7 and dried at 100° C. Two basic formulations, expressed in parts by weight, were prepared for testing purposes as follows:

These slabs made from both formulations were tested for heat aging properties according to the method described in Example IV. After 76 hours at 175° C. no surface bloom was observed on the samples and they were quite flexible. The samples were also suspended over the surface of distilled water for 48 hours at 90° C. and only a minute trace of surface bloom was observed. Thus, the flame retardants of this example are clearly extremely effective.

The source of irradiation used in Examples IV—IV was a one mev. electron beam generator.

*Example VII*

Representative flame retardant systems of the present invention were tested with polymers other than polyethylene. Formulations were prepared as follows:

| Sample No. | Polystrene (Parts by weight) | Aluminum endo-1,4,5, 6,7,7-hexachlorobicyclo [2.2.1]-5-heptene 2,3 dicarboxylate (Parts by weight) | $Sb_2O_3$ |
|---|---|---|---|
| 1 | 100 | 5 | 5 |
| 2 | 100 | 10 | 10 |
| 3 | 100 | 20 | 20 |
| 4 | 100 | 2.5 | 2.5 |

| Sample No. | Polypropylene (Parts by weight) | Aluminum endo-1,4,5 6,7,7-hexachlorobicyclo [2.2.1]-5-heptene 2,3 dicarboxylate (Parts by weight) | $Sb_2O_3$ |
|---|---|---|---|
| 5 | 100 | 5 | 5 |
| 6 | 100 | 10 | 10 |
| 7 | 100 | 20 | 20 |
| 8 | 100 | 2.5 | 2.5 |

These formulations were formed into slabs having a thickness of 1/16 inch and tested according to ASTM Test D-635. The results of these tests are indicated in Table 4.

TABLE 4

| Sample No. | Average burning rate in inches/min. or classification |
|---|---|
| 1 | 1.75±0.42. |
| 2 | 1.79±0.54. |
| 3 | Self-extinguishing before 1" mark. |
| 4 | 2.18±0.42. |
| 5 | Approximately 1". |
| 6 | Approximately 1". |
| 7 | Self-extinguishing before 1" mark. |
| 8 | Approximately 1". |

While the present invention is not considered to be limited to any particular theory of operation, but it is believed that it is possible that, during flame retardation, metal halides, oxyhalides, and, perhaps, metal carbonyl halides are formed in addition to the halides of antimony or its equivalents. These metal-halogen compounds could be capable of catalyzing the heterolytic cleavage of hydroperoxides and hence greatly reduce oxidative chain branching. Furthermore, they could act as Lewis acids and promote polymerization and cross-linking at or near the flame. In addition, the salts, being non-volatile, cause more holagen compounds to be formed in or over the flame than conventional volatile flame retardants.

As previously noted, the choice of the flame retardant system of the present invention to be used with a given flammable material will depend upon the combustion temperature of the flammable material. However, it is within the scope of the present invention to use an additive in combination with the flame retardant system in order to lower the effective temperature at which the system operates as a flame retardant. The flame retardant systems of the present invention are particularly adapted for use in admixture with polyethylene and polypropylene. In addition, these systems may be used with materials such as polyesters, polystyrenes, acrylic resins, epoxy resins, alkyds, elastomers such as copolymers of butadiene-styrene, butyl rubber, polysiloxane, natural rubber, polyisoprene, polychloroprene, copolymers of butadiene-acrylonitrile, polyurethanes, vinyl polymers, cellulosic materials and the like.

The flame retardant systems of the present invention also comprise metal compounds comprising metals selected from Groups III, IV and V of the Periodic Table, e.g., salts of antimony, arsenic, tin, titanium, boron and bismuth. These compounds primarily combine with the metal salts of halogen-bearing carboxylic acids of the present invention to form inorganic halides which function as flame retardants. The inorganic halides are quite hygroscopic and/or corrosive, making them very difficult to incorporate into flammable materials such as polymeric plastics. Therefore, it is much more desirable to produce them as required in the compositions as products of other materials capable of reacting at the burning temperature of the flammable material. The flame retardant systems of the present invention function to produce this desirable result.

Generally speaking, at least about 5% of the flame retardant system of the present invention, based on the weight of the entire composition, is required to produce a significant flame inhibiting action. However, for some systems, e.g., the aluminum salt of tetrachlorophthalic acid, as much as 40% of the flame retardant system is preferred. The flame retardant system is preferably a minor proportion, i.e., less than 50% by weight, so as to minimize possible detrimental effects upon the physical properties of the flammable material to which it is added. In any event, only routine experimentation is required to determine the type and amount of flame retardant system which is effective to produce a desired amount of flame inhibition and less than 5% may be used when found effective.

As previously discussed, one of the principal advantages of flame retardant systems of the present invention are their resistance to water. In this regard, it should be noted that not all derivatives of halogen-bearing carboxylic acids are water resistant. For example, the disodium and magnesium tetrabromophthalates are partially water soluble. Thus, in those environments where resistance to water is important, the substantially water insoluble derivatives of the present invention are particularly useful.

Having fully described my invention, it is to be understood that I do not wish to be limited to the details set forth, but my invention is of the full scope of the appended claims.

I claim:
1. A composition comprising a flammable material having incorporated therein a flame retardant system capable of reacting at the flame temperature of said flammable material to produce a flame retardant halide compound, said system comprising a substantially water insoluble derivative of a halogen-bearing carboxylic acid, said derivative being selected from the group consisting of metal tetrahalophthalates, metal trihalobenzoates, metal halobenzoate-o-sulfonates, metal salts of endo-1,4,5,6,7,7 - hexahalobicyclo-(2.2.1)-5-heptene - 2,3 - dicarboxylic acids, and a compound having a cation selected from the group consisting of elements in Group V of the Periodic Table.

2. The composition of claim 1 wherein said flammable material is a polymer.

3. The composition of claim 2 wherein said polymer is polyethylene.

4. The composition of claim 1 wherein said derivative is aluminum tetrabromophthalate.

5. The composition of claim 1 wherein said derivative is calcium tetrabromophthalate.

6. The composition of claim 1 wherein said derivative is aluminum 2,3,4-triiodobenzoate.

7. The composition of claim 1 wherein said derivative is aluminum endo-1,4,5,6,7,7-hexachlorobicyclo-(2.2.1)-5-heptene-2,3-dicarboxylate.

8. The composition of claim 1 wherein said cation is antimony.

9. The composition of claim 1 wherein said derivative is aluminum tetrabromophthalate and said cation is antimony.

10. The composition of claim 1 where said derivative is aluminum 2,3,4-triiodobenzoate and said cation is antimony.

11. The composition of claim 1 wherein said system is present in an amount of at least about 5% by weight, based on the weight of said composition.

12. A flame retardant system comprising a composition having a cation selected from the group consisting of elements in Group V of the Periodic Table and a substantially water insoluble derivative of a halogen bearing carboxylic acid, said derivative being selected from the group consisting of metal tetrahalophthalates, metal trihalobenzoates, metal halobenzoate-o-sulfonates, metal salts of endo-1,4,5,6,7,7-hexahalobicyclo-(2.2.1)-5-heptene-2,3-dicarboxylic acids.

13. The composition of claim 12 wherein said derivative is aluminum tetrabromophthalate.

14. The composition of claim 12 wherein said derivative is calcium tetrabromophthalate.

15. The composition of claim 12 wherein said derivative is aluminum 2,3,4-triiodobenzoate.

16. The composition of claim 12 wherein said derivative is aluminum endo-1,4,5,6,7,7-hexachlorobicyclo-(2.2.1)-1-heptene-2,3-dicarboxylate.

17. The composition of claim 12 wherein said cation is antimony.

18. The composition of claim 12 wherein said derivative is aluminum tetrabromophthalate and said cation is antimony.

19. The composition of claim 12 wherein said derivative is aluminum 2,3,4-triiodobenzoate and said cation is antimony.

20. The composition of claim 2 wherein said polymer has been irradiated.

21. The composition of claim 3 wherein said polyethylene has been irradiated.

22. The composition of claim 1 wherein said derivative is barium tetrabromobenzoate-o-sulfonate.

23. The composition of claim 12 wherein said derivative is barium tetrabromobenzoate-o-sulfonate.

References Cited

UNITED STATES PATENTS 2,909,501  10/1959  Robitschek et al.

FOREIGN PATENTS 514,329  7/1955  Canada.

DONALD E. CZAJA, *Primary Examiner.*

MURRAY TILLMAN, *Examiner*

N. F. OBLON, V. P. HOKE, *Assistant Examiners.*